(12) United States Patent
Jun et al.

(10) Patent No.: US 9,278,504 B2
(45) Date of Patent: Mar. 8, 2016

(54) DECORATIVE FILM TO BE ATTACHED TO OUTSIDE SURFACE OF HOME APPLIANCE AND METHOD FOR MANUFACTURING THE SAME

(75) Inventors: Hyun Woo Jun, Changwon-si (KR); Hyun Gi Jung, Changwon-si (KR); Min Ju Son, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 807 days.

(21) Appl. No.: 13/386,713

(22) PCT Filed: Aug. 17, 2010

(86) PCT No.: PCT/KR2010/005415
§ 371 (c)(1),
(2), (4) Date: Jan. 24, 2012

(87) PCT Pub. No.: WO2011/021829
PCT Pub. Date: Feb. 24, 2011

(65) Prior Publication Data
US 2012/0121865 A1  May 17, 2012

(30) Foreign Application Priority Data

Aug. 18, 2009 (KR) .................. 10-2009-0076124
Aug. 18, 2009 (KR) .................. 10-2009-0076201

(51) Int. Cl.
*B32B 15/08* (2006.01)
*B32B 23/04* (2006.01)
(Continued)

(52) U.S. Cl.
CPC ............. *B32B 15/08* (2013.01); *B32B 17/06* (2013.01); *B32B 23/042* (2013.01); *B32B 27/08* (2013.01);
(Continued)

(58) Field of Classification Search
CPC ........ B32B 15/08; B32B 17/06; B32B 27/08; B32B 23/042; B32B 27/304; B32B 27/36
USPC ...................................... 428/457, 480, 913.3
See application file for complete search history.

(56) References Cited

U.S. PATENT DOCUMENTS

| 5,296,340 A | 3/1994 | Tsukada et al. ............... 430/394 |
| 6,436,159 B1 * | 8/2002 | Safta et al. ...................... 51/298 |

(Continued)

FOREIGN PATENT DOCUMENTS

| CN | 1498781 A | 5/2004 |
| CN | 101138929 A | 3/2008 |

(Continued)

OTHER PUBLICATIONS

International Search Report and Written Opinion dated Aug. 27, 2012 issued in Application No. PCT/KR2010/005415.

(Continued)

*Primary Examiner* — Betelhem Shewareged
(74) *Attorney, Agent, or Firm* — Ked & Associates, LLP

(57) ABSTRACT

The present invention relates to a decorative film to be attached to an outside surface of a home appliance and a method for manufacturing the same, and more particularly, to a decorative film to be attached to an outside surface of a home appliance which is to be attached to an outside of a home appliance, such as a refrigerator, an air conditioner or a washing machine, replacing stainless steel panel etched to form a pattern to have metal feeling; and a method for manufacturing the same. The decorative film to be attached to an outside surface of a home appliance comprises a base layer, a pattern layer on a back side of the base layer, the pattern layer having a micro pattern, a metal layer on a back side of the pattern layer, and a protective layer of synthetic resin attached to a back side of the metal layer for protecting the metal layer.

6 Claims, 4 Drawing Sheets

(51) Int. Cl.
  *B32B 17/06* (2006.01)
  *B32B 27/36* (2006.01)
  *B32B 27/08* (2006.01)
  *B32B 27/30* (2006.01)

(52) U.S. Cl.
  CPC .............. *B32B 27/304* (2013.01); *B32B 27/36* (2013.01); *Y10T 156/10* (2015.01); *Y10T 156/1039* (2015.01); *Y10T 428/24612* (2015.01)

(56) References Cited

U.S. PATENT DOCUMENTS

| | | | |
|---|---|---|---|
| 7,157,133 B2 | 1/2007 | Moran | 428/172 |
| 2003/0211337 A1* | 11/2003 | Muraoka | 428/432 |
| 2004/0166336 A1 | 8/2004 | Lindvold et al. | 428/457 |
| 2004/0216406 A1 | 11/2004 | Egashira | 52/311.1 |
| 2005/0221063 A1* | 10/2005 | Suzuki et al. | 428/195.1 |
| 2006/0254702 A1 | 11/2006 | Emslander et al. | 156/244.11 |

FOREIGN PATENT DOCUMENTS

| | | | | |
|---|---|---|---|---|
| CN | 101417579 A | 4/2009 | | |
| CN | 101497502 A | 8/2009 | | |
| EP | 0 685 350 A1 | 12/1995 | | |
| JP | 07-314631 A | 12/1995 | | |
| JP | 2001-001444 A | * 1/2001 | ............. | B32B 15/08 |
| JP | 2005-219504 A | 8/2005 | | |
| KR | 10-2003-0087100 A | 11/2003 | | |
| KR | 10-0780413 B1 | 11/2007 | | |
| KR | 10-2009-0012949 | 2/2009 | | |
| WO | WO 97/25158 A1 | 7/1997 | | |
| WO | WO 2007/040339 A1 | 4/2007 | | |
| WO | WO 2007/066410 A1 | 6/2007 | | |
| WO | WO 2009/025463 A2 | 2/2009 | | |

OTHER PUBLICATIONS

European Search Report dated Apr. 8, 2014 issued in Application No. 10 81 0137.9.

* cited by examiner

DECORATIVE FILM TO BE ATTACHED TO OUTSIDE SURFACE OF HOME APPLIANCE AND METHOD FOR MANUFACTURING THE SAME

CROSS-REFERENCE TO RELATED PATENT APPLICATIONS

This application is a U.S. National Stage Application under 35 U.S.C. 5371 of PCT Application No. PCT/KR2010/005415, filed Aug. 17, 2010, which claims priority to Korean Patent Application Nos. 10-2009-0076201 and 10-2009-0076124, both filed Aug. 18, 2009, whose entire disclosures are incorporated herein by reference.

TECHNICAL FIELD

The present invention relates to a decorative film to be attached to an outside surface of a home appliance and a method for manufacturing the same, and more particularly, to a decorative film to be attached to an outside surface of a home appliance which is to be attached to an outside of a home appliance, such as a refrigerator, an air conditioner or a washing machine, replacing stainless steel panel etched to form a pattern to have metal feeling; and a method for manufacturing the same.

BACKGROUND ART

In general, a panel having an elegant design is attached to an outside of the home appliance, such as the refrigerator, the air conditioner or the washing machine. Recently, as demands on a design which has metal feeling or can produce different colors increase sharply, by forming a pattern on a surface of a stainless steel panel by photolithography, metal feeling and different colors unique to the stainless steel are produced.

FIGS. 1(a)~1(d) illustrate a prior art process for manufacturing a decorative panel including the steps of forming a pattern on a stainless steel panel and attaching the stainless steel panel to a glass plate.

Referring to FIG. 1(a), photoresist is applied to an outside of a stainless steel panel, and a UV beam is projected to the stainless steel panel through a glass plate having a mask with pattern attached thereto. According to this, the pattern of the mask is transcribed to the photoresist on the surface of the panel, temporarily. Then, referring to FIG. 1(b), an etching solution is applied to etch the stainless steel panel, to form the pattern of the design on the surface of the stainless steel panel. Then, referring to FIG. 1(c), a PSA (Pressure Sensitive Adhesive) is coated to one side of the glass plate, and a sheet of release paper is attached thereto and passed through rollers, for lamination of the adhesive. Finally, referring to FIG. 1(d), the sheet of release paper is peeled off the glass plate, the stainless steel panel is aligned with the glass plate such that the surface of the stainless steel panel having the pattern formed thereon is in contact with the surface of the glass plate having the adhesive coated thereto, and the stainless steel panel and the glass plate aligned thus are passed through rollers to laminate, to complete a decorative panel of the stainless steel panel and the glass plate attached to the stainless steel panel.

However, a decorative panel according to the prior art is expensive more than a plastic film due to the stainless steel panel. And the photolithography costs high. Moreover, in manufacturing the decorative panel, an individual process is required for each product due to the stainless steel plate, which results in poor productivity.

DISCLOSURE OF INVENTION

Technical Problem

To solve the problems, an object of the present invention is to provide a decorative film to be attached to an outside surface of a home appliance which enables to produce metal feeling even without using a stainless steel plate and mass production economically; and a method for manufacturing the same.

Another object of the present invention is to provide a decorative film to be attached to an outside surface of a home appliance which enables to produce a design which displays different colors depending on an angle of view by means of pattern imprinting and a metal layer; and a method for manufacturing the same.

Another object of the present invention is to provide a decorative film to be attached to an outside surface of a home appliance which enables to maximize metal feeling while producing a design having different colors by gravure printing; and a method for manufacturing the same.

Solution to Problem

To achieve these objects and other advantages and in accordance with the purpose of the invention, as embodied and broadly described herein, a decorative film to be attached to an outside surface of a home appliance comprises a base layer, a pattern layer on a back side of the base layer, the pattern layer having a micro pattern, a metal layer on a back side of the pattern layer, and a protective layer of synthetic resin attached to a back side of the metal layer for protecting the metal layer.

Preferably, the base layer is formed of a synthetic resin which can transmit a light.

Preferably, the base layer has an UV coating applied to a surface thereof.

Preferably, the decorative film further comprises a printed layer between the back side of the pattern layer and the metal layer.

Preferably, the printed layer is printed with ink mixed with metal powder.

Preferably, the metal layer is formed of aluminum by deposition, or an aluminum sheet by attaching.

Preferably, the protective layer is formed of PVC resin or PET resin.

Preferably, the protective layer comprises a PET resin layer attached to a back side of the metal layer and a PVC resin layer attached to a back side of the PET resin layer.

Preferably, the decorative film further comprises a glass panel attached to a front surface of the base layer.

In another aspect of the present invention, a method for manufacturing a decorative film to be attached to an outside surface of a home appliance comprises the steps of forming a base layer of synthetic resin, forming a pattern layer on a back side of the base layer to have a micro pattern, forming a metal layer on a back side of the pattern layer, and attaching a protective layer of synthetic resin to a back side of the metal layer.

Preferably, the step of forming a base layer comprises the step of applying a UV coating to a surface of the base layer.

Preferably, the step of forming a pattern layer comprises the step of pressing down a master mold having a pattern formed thereon onto UV curable resin, and projecting a UV beam to the UV curable resin to cure the UV curable resin, to form a pattern.

Preferably, the method further comprises the step of forming a printed layer on the back side of the pattern layer.

Preferably, the step of forming a printed layer comprises the step of printing by a gravure process.

Preferably, the step of forming a printed layer comprises the step of printing by a gravure process with ink mixed with metal powder.

Preferably, the step of forming a metal layer comprises the step of deposition of aluminum on the back side of the printed layer.

Preferably, the step of forming a metal layer comprises the step of attaching an aluminum sheet to the back side of the printed layer.

Preferably, the synthetic resin attached in the step of attaching the protective layer is PVC resin or PET resin.

Preferably, the step of attaching a protective layer comprises the step of attaching the PET resin to the back side of the metal layer and attaching the PVC resin thereto.

Preferably, the method further comprises the step of attaching a front surface of the base layer to a glass panel before the protective layer is attached after formation of the metal layer.

Advantageous Effects of Invention

The decorative film to be attached to an outside surface of a home appliance and the method for manufacturing the same of present invention has following advantageous effects.

Metal feeling can be produced without using a stainless steel plate, and application of an economic manufacturing process and inexpensive material permits mass production at a low cost.

A design can be produced which displays different colors depending on an angle of view by using pattern imprinting and metal deposition.

Metal feeling can be maximized by gravure printing while producing a design having different colors, actually.

BRIEF DESCRIPTION OF DRAWINGS

The accompanying drawings, which are comprised to provide further understanding of the disclosure and are incorporated in and constitute a part of this application, illustrate embodiments of the disclosure and together with the description serve to explain the principle of the disclosure.

In the drawings.

BEST MODE FOR CARRYING OUT THE INVENTION

Reference will now be made in detail to the specific embodiments of the present invention, examples of which are illustrated in the accompanying drawings. Wherever possible, the same reference numbers will be used throughout the drawings to refer to the same or like parts.

FIGS. 2 to 5 illustrate sections of decorative films each to be attached to a surface of a home appliance in accordance with preferred embodiments of the present invention, showing layers thereof, respectively.

Figure 1:
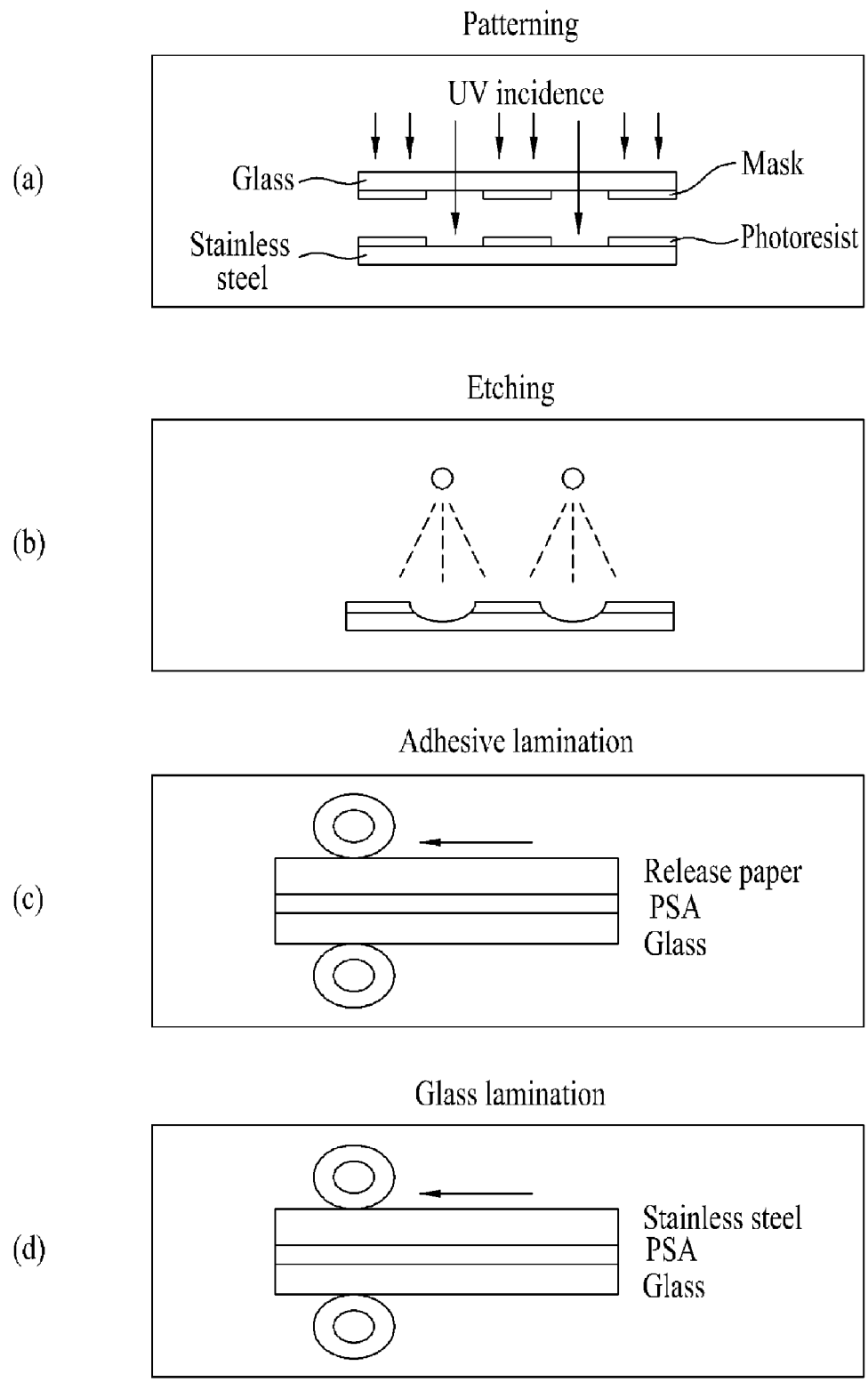
FIGS. 1(a)~1(d) illustrate a prior art process for manufacturing a decorative panel including the steps of forming a pattern on a stainless steel panel and attaching the stainless steel to a glass plate.
Figure 2:
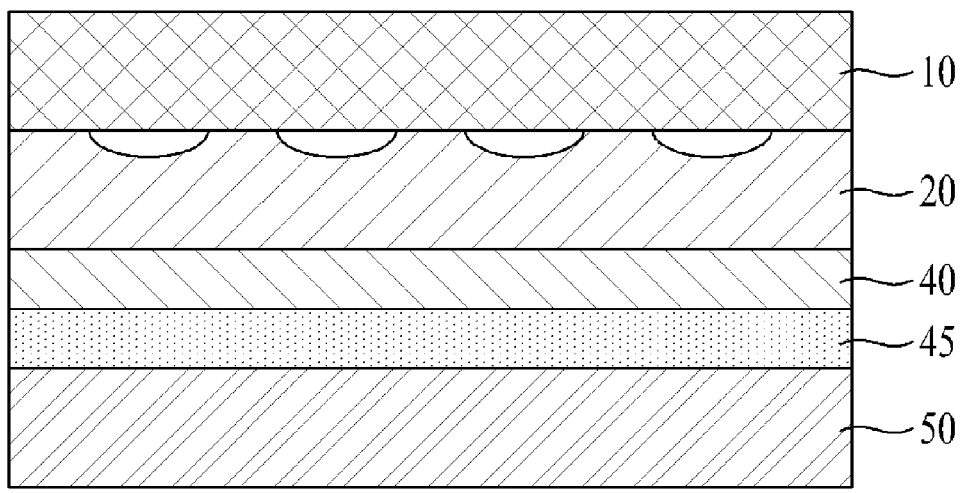
FIG. 2 illustrates a section of a decorative film to be attached to a surface of a home appliance in accordance with a first preferred embodiment of the present invention, showing layers thereof.

Referring to FIG. 2, the decorative film to be attached to a surface of a home appliance comprises a base layer 10, a pattern layer 20 having a micro pattern on a back side of the base layer 10, a metal layer 40 on a back side of the pattern layer 20, and a protective layer 50 attached to a back side of the metal layer for protecting the metal layer 40.

For making the pattern of the pattern layer 20 and a surface of the metal layer 40 visible, the base layer 10 is required to be at least semi-transparent. Therefore, it is preferable that the base layer 10 is formed of transparent synthetic resin. It is preferable that the base layer 10 is formed of a around 10~200 µm thick PET (Polyethylene terephthalate) film. Moreover, it is preferable that the base layer 10 has an UV coating applied to a surface thereof for enhancing scratch resistance and film hardness.

The UV coating is a method for coating a coating object by using paint which is hardened within a short time period when an UV beam is applied thereto, and has hardness, chemical resistance, and corrosion resistance stronger than general polyurethane paint. According to this, the scratch resistance and hardness of the film can be enhanced.

Figure 6:
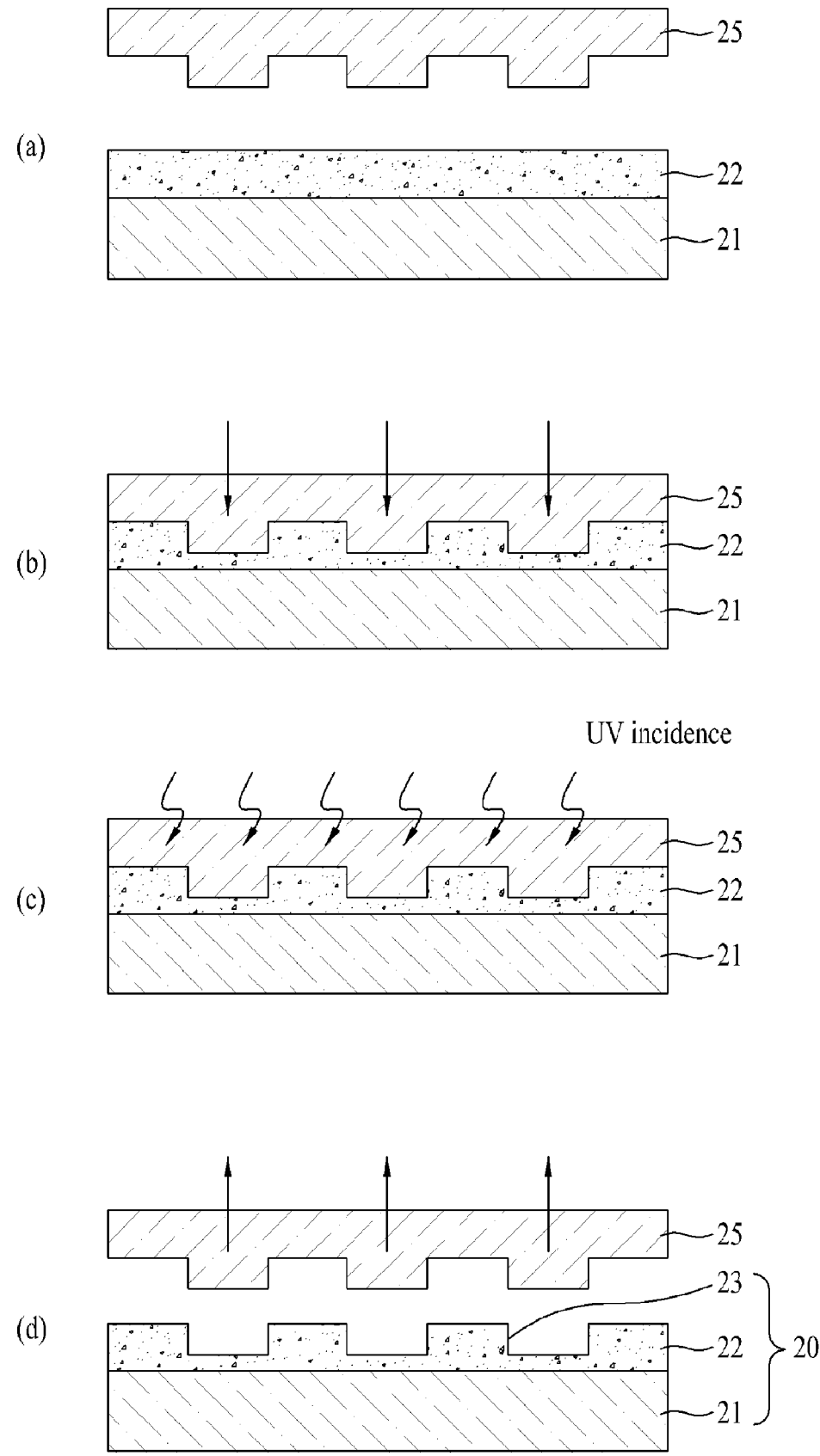
FIG. 6 illustrates sections showing the steps of a process for forming a pattern by imprinting in a method for manufacturing a decorative film to be attached to a surface of a home appliance in accordance with a preferred embodiment of the present invention.

The pattern layer 20 is formed by setting liquid resin by imprinting. A process for forming the pattern layer 20 is shown in FIG. 6, and will be described in detail in description of a method for manufacturing a decorative film to be made later. In brief, the pattern layer 20 is formed by pressing down a master mold having a micro pattern onto liquid UV curable resin and curing the resin. Particularly, it is preferable that the liquid resin is acryl resin, and the pattern layer 20 has thickness in a range of 50~200 µm.

Different from a prior art in which a thin stainless steel plate is etched to form the micro pattern, the pattern layer 20 is formed by coating the liquid resin on the base layer 10, pressing down the base layer 10 having the liquid resin coated thereon with the master mold, and setting the liquid resin.

Figure 3:
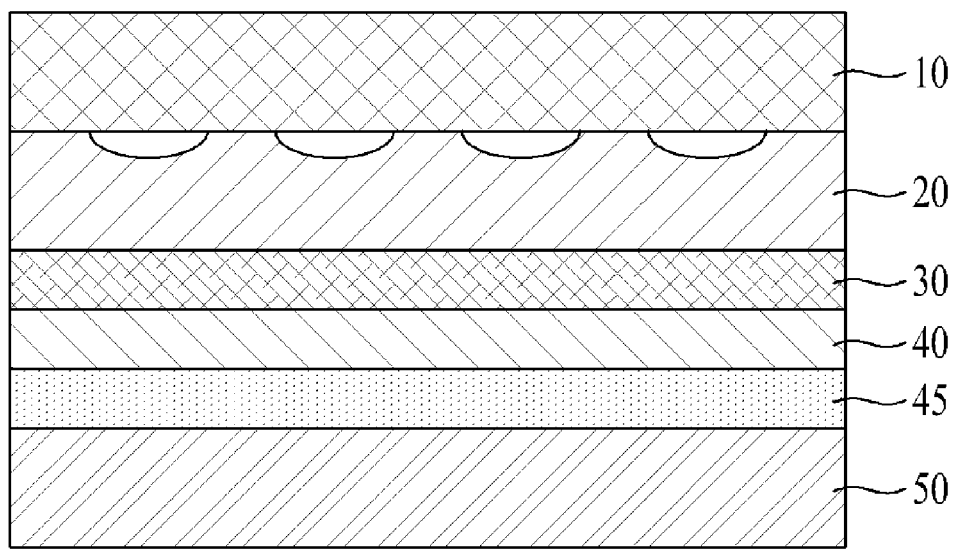
FIG. 3 illustrates a section of a decorative film to be attached to a surface of a home appliance in accordance with a second preferred embodiment of the present invention, showing layers thereof.
Figure 4:
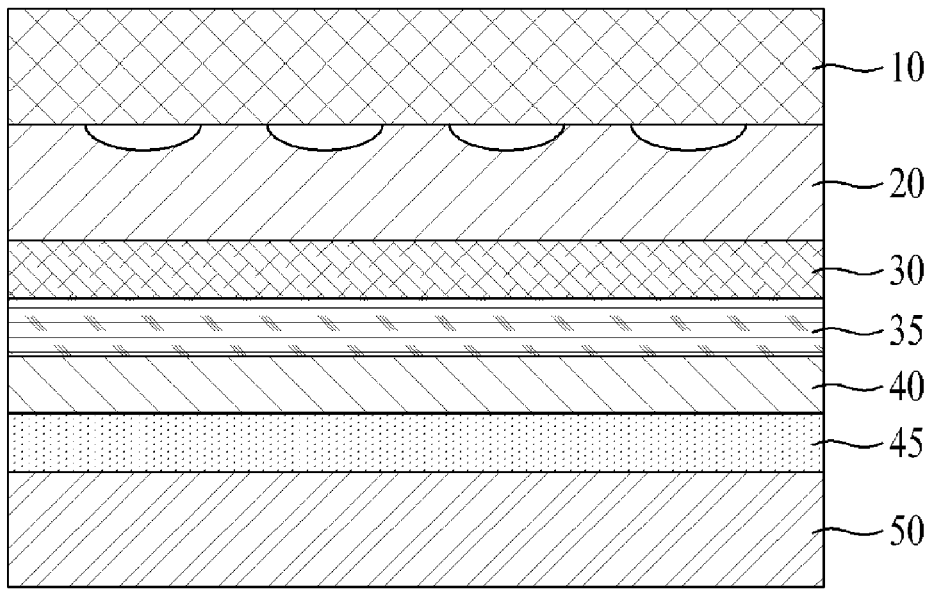
FIG. 4 illustrates a section of a decorative film to be attached to a surface of a home appliance in accordance with a third preferred embodiment of the present invention, showing layers thereof.

Referring to FIGS. 3 and 4, the decorative film of the present invention may further comprise a printed layer 30 between the pattern layer 20 and the metal layer 40 formed by printing on the back side of the pattern layer 20. It is preferable that the printed layer 30, printed on the back side of the pattern layer 20 of synthetic resin, is printed by gravure printing. The gravure printing enables to produce a desired design by printing each of colors of the design continuously over a number of times.

Moreover, it is more preferable that the printed layer 30 is printed with ink having metal powder in the gravure printing. The metal powder mixed with the ink is flakes or pearls of 50 µm thick or below, for displaying a metallic color, not only with the metal layer, but also with the metal powder. Preferably, the printed layer 30 has thickness in a range of 20~100 µm.

The metal layer 40 on the back side of the pattern layer 20 makes the user to have metal feeling. The metal layer 40 can be formed by depositing metal on the back side of the pattern layer 20 to thickness of 10~100 µm. It is preferable that the metal deposited thus is aluminum, because the aluminum shows the metal feeling of a silvery gray color well, and has a greatest effect as a back ground layer in making an image of the pattern layer 20 to stand out in relief.

Referring to FIGS. 3 and 4, in a case the decorative film of the present invention comprises the printed layer 30, the metal layer 40 is formed by depositing metal on the back side of the printed layer 30.

Or, alternatively, the metal layer 40 can be formed by attaching a thin aluminum sheet. In this case, different from the aluminum deposition, it is preferable that an adhesive 35 is coated on a front surface of the aluminum sheet for attachment to the printed layer 30.

Besides the effect of the metal layer 40 in which the metal layer 40 makes both the pattern of the pattern layer 20 and the image of the printed layer 30 to stand out in relief and the user to have feeling unique to metal, the metal layer 40 makes the pattern layer 20 to display different colors depending on an angle of view. This is because a wavelength of the light, passed through the pattern layer 20 and reflected at a surface of the metal layer 40, varies with a wavelength of a light incident thereon.

The protective layer 50 is formed by coating an adhesive 45 to a 50~200 µm thick sheet of PVC or PET resin and pressing down the sheet between two rollers to laminate the sheet with the adhesive 45 for protecting, not only the metal layer 40, but also the pattern layer 20. The protective layer 50 can prevent defects such as scratch from taking place at a product in an additional assembly process. The protective layer 50 of the decorative film is a very part that is to be attached to a home appliance. Since the protective layer 50 can be formed of a non-transparent material, in general, the protective layer 50 is lamination of a PVC sheet.

Figure 5:
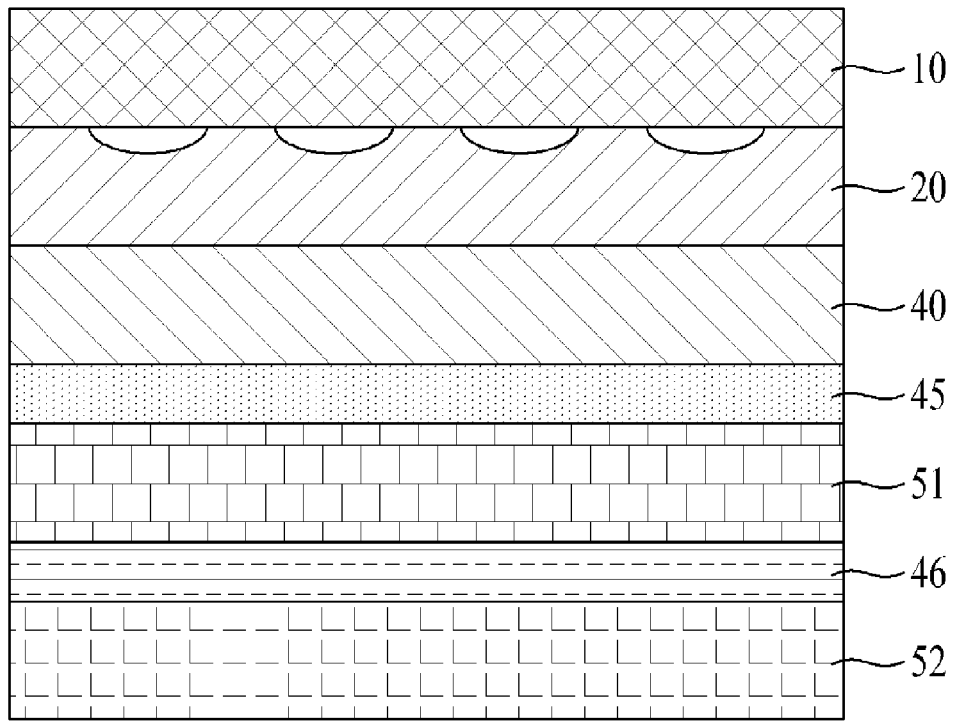
FIG. 5 illustrates a section of a decorative film to be attached to a surface of a home appliance in accordance with a fourth preferred embodiment of the present invention, showing layers thereof.

Referring to FIG. 5, the protective layer 50 may also comprise a PET layer 51 laminated to a back side of the metal layer 40 with an adhesive 45 disposed therebetween, and a PVC layer 52 attached to a back side of the PET layer 51 with an adhesive 46 disposed therebetween. A stack of the PET layer 51 and the PVC layer 52 has a thickness of about 50~200 µm.

By cutting a semi-finished product of the decorative film formed thus according to an outside shape of the home appliance and attaching to the home appliance, a finished a home appliance is produced. A glass panel can be attached to a front surface of the decorative film. In this case, as described later, the decorative film formed up to the metal layer is laminated to the glass panel before the protective layer 50 is laminated, and the protective layer 50 is laminated.

A method for manufacturing a decorative film to be attached to a surface of a home appliance in accordance with a preferred embodiment of the present invention will be described with reference to FIG. 6. FIG. 6 illustrates sections showing the steps of a method for forming a pattern by imprinting in a method for manufacturing a decorative film to be attached to a surface of a home appliance in accordance with a preferred embodiment of the present invention.

The method for manufacturing a decorative film to be attached to a surface of a home appliance in accordance with a preferred embodiment of the present invention comprises the steps of forming a base layer 10 of synthetic resin, forming a pattern layer 20 having a micro pattern on a back side of the base layer 10, forming a metal layer 40 on a back side of the pattern layer 20, and attaching a protective layer 50 of synthetic resin to a back side of the metal layer 40.

At first, the base layer 10 is formed of synthetic resin. It is preferable that the base layer 10 is formed of a 10~200 mm thick transparent PET (Polyethylene terephthalate) film. Moreover, it is preferable that the base layer 10 has a UV coating applied to a surface thereof for enhancing scratch resistance and film hardness.

Then, liquid resin is set by imprinting, to form a pattern layer 20. Different from the prior art in which a stainless steel sheet is etched by photolithography to form a pattern, in the present invention, a master mold is fabricated, and the master mold is imprinted on the synthetic resin, to form the pattern.

The imprinting to be applied to the present invention will be described in detail. At first, referring to FIG. 6(a) a master mold 25 having a desired pattern in relief is fabricated, liquid UV curable resin 22 is coated on a surface of the base layer 21 of synthetic resin, such as PET resin or the like, and the master mold 25 and the base layer 21 are aligned. Then, referring to FIG. 6(b), the master mold 25 is pressed down onto the UV curable resin 22. It is preferable that the pressing down is done by two pressing rollers. Then, referring to FIG. 6(c), a UV beam is projected to the UV curable resin 22 to cure the same. Finally, referring to FIG. 6(d), the master mold 25 is separated from the UV curable resin 22 cured thus, to form the pattern layer 20 having a desired pattern 23 formed in intaglio in a surface of the resin layer 22 as a pattern of the master mold is transcribed to the resin layer. It is preferable that the liquid resin is acryl UV curable resin 22, and the pattern layer 20 formed thus has a thickness in a range of 50~200 mm.

Moreover, it is effective to perform sub-steps of the step for forming a pattern layer continuously. As an example, the master mold 25 is rotatably provided to a roller, the synthetic resin of the base layer 21 is conveyed by a conveying roller to coat the resin as the conveyor roller passes through a resin coating unit, then, the master mold 25 and the base layer 21 having the resin coated thereon are pressed down between two rotating rollers to transcribe the pattern, the UV curable resin 22 coated on the base layer 21 is cured at a UV curing unit, and a semi-product having the pattern 24 cured thus formed thereon is wound at a winding roller again for the next step.

Though photolithography or imprinting is used for arranging circuit devices on a semiconductor substrate having a diameter below 300 mm in the prior art, the present invention enables to form a pattern of the decorative film having a size greater than 300 mm. The decorative film to be attached to a front surface of the home appliance, such as a refrigerator or a washing machine, may have a size in a range of 1 m, and the present invention enables to form a micro pattern in a range of 1 m. In this instance, the 1 m length denotes a size of entire pattern having the micro patterns put together.

Next, referring to FIGS. 3 and 4, in a method for manufacturing a decorative film of the present invention, the printed layer 30 may be formed before the metal layer 40 is formed on the back side of the pattern layer 20. The printed layer 30 is printed on the back side of the pattern layer 20 of synthetic resin originally, preferably by gravure printing. The gravure printing enables to produce a desired design by printing each of colors of the design continuously over a number of times.

Moreover, in the step of forming a printed layer, it is preferable that the gravure printing is performed with ink having metal powder comprised thereto. The metal powder mixed with the ink is flakes or pearls of 50 µm thick or below, for displaying a metallic color, not only with the metal layer, but also with the metal powder. Preferably, the printed layer 30 has thickness in a range of 20~100 μm.

Then, a metal layer 40 is formed on the back side of the pattern layer 20 or a back side of the printed layer 30. The metal layer 40 can be formed by depositing metal on the back side of the printed layer 30 to thickness in a range of 10~100 μm. It is preferable that the metal deposited thus is aluminum, because the aluminum displays the metal feeling well, and has a greatest effect as a back ground layer for making an image of the pattern layer 20 to stand out in relief.

Referring to FIGS. 3 and 4, in a case the decorative film of the present invention comprises the printed layer 30, the metal layer 40 is formed by depositing metal on the back side of the printed layer 30.

Or, alternatively, the metal layer 40 can be formed by attaching a thin aluminum sheet. In this case, different from the aluminum deposition, it is preferable that an adhesive 35 is coated on a front surface of the metal layer 40 for attachment to the printed layer 30.

Finally, a protective layer 50 of synthetic resin is attached to a back side of the metal layer 40. The protective layer 50 is formed by coating an adhesive 45 to a 50~200 μm thick sheet of PVC or PET resin and pressing down the sheet between two rollers to laminate the sheet with the adhesive 45 and serves for protecting, not only the metal layer 40, but also the pattern layer 20. The protective layer 50 can prevent defects such as scratch from taking place at a product in an additional assembly process. The protective layer 50 of the decorative film is a very part that is to be attached to a home appliance. Since the protective layer 50 may be formed of a non-transparent material, in general, the protective layer 50 is lamination of a PVC sheet.

Referring to FIG. 5, the protective layer 50 may also comprise a PET layer 51 laminated to a back side of the metal layer 40 with an adhesive 45 disposed therebetween, and a PVC layer 52 attached to a back side of the PET layer 51 with an adhesive 46 disposed therebetween. A stack of the PET layer 51 and the PVC layer 52 has a thickness of about 50~200 μm.

In the meantime, a step may be comprised further for attaching a front surface of the base layer to a glass panel (not shown) before attaching the protective layer 50 after formation of the metal layer 40. Though the decorative film of the present invention can be attached to an outside surface of the home appliance directly, a panel of toughened glass or a synthetic resin similar to the glass may be attached to a front surface thereof, additionally. In this case, it is preferable that, after the glass panel is attached to the front surface of the base layer 21 by laminating, the protective layer 50 is laminated on a back side of the metal layer 40. Because the protective layer serves to prevent defects, such as scratch, of the product from taking place in a process of attaching the decorative film of the present invention to the home appliance.

A semi-finished product of the decorative film formed thus is cut according to an outside shape and a size of the home appliance and attached to the home appliance with an adhesive disposed between the protective layer and a surface of the home appliance.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A decorative film to be attached to an outside surface of a home appliance, the decorative film comprising:
   a base layer formed of a synthetic resin that transmits light;
   a pattern layer formed on a back side of the base layer, the pattern layer having a micro pattern, wherein the pattern layer is formed by pressing down a master mold having a micro pattern onto liquid UV curable resin and curing the resin, wherein the micro pattern displays different colors depending on an angle of view;
   a metal layer on a back side of the pattern layer, wherein the metal layer is formed of aluminum by deposition or is an aluminum sheet;
   a gravure-printed layer between the back side of the pattern layer and the metal layer, wherein the gravure-printed layer is printed using ink mixed with metal powder; and
   a protective layer of synthetic resin attached to a back side of the metal layer for protecting the metal layer.

2. The decorative film as claimed in claim 1, wherein the base layer has a UV coating applied to a surface thereof.

3. The decorative film as claimed in claim 1, wherein the protective layer is formed of PVC (polyvinyl chloride) resin or PET resin.

4. The decorative film as claimed in claim 1, wherein the protective layer includes a PET resin layer attached to a back side of the metal layer and a PVC (polyvinyl chloride) resin layer attached to a back side of the PET resin layer.

5. The decorative film as claimed in claim 1, further including a glass panel attached to a front surface of the base layer.

6. The decorative film as claimed in claim 1, wherein the metal powder includes flakes or pearls.

* * * * *